US012725276B2

(12) United States Patent
Choi et al.

(10) Patent No.: US 12,725,276 B2
(45) Date of Patent: Sep. 1, 2026

(54) MOTION FEEDBACK METHOD AND SYSTEM USING NORMALIZED DATA

(71) Applicant: GWANGJU INSTITUTE OF SCIENCE AND TECHNOLOGY, Gwangju (KR)

(72) Inventors: Yun Ho Choi, Gwangju (KR); Kyung Joong Kim, Gwangju (KR); Eun Hee Kim, Gwangju (KR); Jin Ha Noh, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 234 days.

(21) Appl. No.: 18/635,516

(22) Filed: Apr. 15, 2024

(65) Prior Publication Data

US 2024/0378730 A1 Nov. 14, 2024

(30) Foreign Application Priority Data

May 11, 2023 (KR) ........................ 10-2023-0061217

(51) Int. Cl.
*G06T 7/20* (2017.01)
*G06V 10/80* (2022.01)

(52) U.S. Cl.
CPC .............. *G06T 7/20* (2013.01); *G06V 10/803* (2022.01); *G06T 2207/20044* (2013.01)

(58) Field of Classification Search
None
See application file for complete search history.

(56) References Cited

U.S. PATENT DOCUMENTS

| | | | | |
|---|---|---|---|---|
| 9,679,604 | B2 * | 6/2017 | Yoshida | G11B 27/10 |
| 2012/0143358 | A1 * | 6/2012 | Adams | G06F 3/04815 700/92 |
| 2018/0255879 | A1 * | 9/2018 | Taryma | A63B 24/0062 |
| 2018/0353836 | A1 * | 12/2018 | Li | A63B 71/06 |
| 2022/0262010 | A1 * | 8/2022 | Shpuza | G06V 20/46 |

FOREIGN PATENT DOCUMENTS

| | | | |
|---|---|---|---|
| KR | 20170097888 | A | 8/2017 |
| KR | 20170110981 | A | 10/2017 |
| KR | 20210138851 | A | 11/2021 |
| KR | 102369945 | B1 | 3/2022 |
| KR | 20220088862 | A | 6/2022 |
| KR | 102498415 | B1 | 2/2023 |

OTHER PUBLICATIONS

Request for the Submission of an Opinion dated Dec. 17, 2024 for Korean Patent Application No. 10-2023-0061217.

* cited by examiner

*Primary Examiner* — Leon Viet Q Nguyen
(74) *Attorney, Agent, or Firm* — Scully, Scott, Murphy & Presser, P.C.

(57) ABSTRACT

A motion feedback method is disclosed. The method includes: acquiring a frame in which a scene of the motion performed by a user is captured through a camera; acquiring motion data of the user by analyzing the captured frame; acquiring pressure data measured in response to the user's motion through a pressure sensor; generating comparison target data by normalizing the motion data and the pressure data so as to correspond to pre-prepared reference data according to the expert's motion; and comparing the reference data and the comparison target data to generate feedback data for the user's motion, and outputting the generated feedback data.

9 Claims, 12 Drawing Sheets

MOTION FEEDBACK METHOD AND SYSTEM USING NORMALIZED DATA

CROSS REFERENCE TO RELATED APPLICATION

The present application claims the priority to Korean Patent Application No. 10-2023-0061217, filed on May 11, 2023, the entire contents of which is incorporated herein by reference for all purposes.

BACKGROUND

Field

The present invention relates to a motion feedback method and system using normalized data. This work was supported by the GIST-MIT Research Collaboration grant funded by the GIST in 2023. This research was supported by “Project for Science and Technology Opens the Future of the Region” program through the INNOPOLIS FOUNDATION funded by Ministry of Science and ICT.

Description of the Related Art

As various smart devices are supplied by virtue of the development of an Internet and an IT hardware technology, home training that allows people to train at home without going to a professional training institution such as a health club or a yoga academy is increasing. In particular, recently, as an environment has been created where an outdoor activity is restricted due to the need for social distancing, this home training trend is further accelerating. In line with this trend, the development of an equipment and an application for home training is actively progressing, and many programs that show correct posture to a user and allow the user to follow through a video by the smart device are being produced and distributed.

However, most home training programs consist of a pre-made video or a still image, making it difficult to evaluate whether the user is in the right posture. Due to this, the user is more likely to exercise with incorrect posture, which can reduce exercise effectiveness or, in severe cases, cause a side effect such as physical injury. Therefore, in order to increase exercise effectiveness of the home training user and to enable efficient home training, a method is required to measure the user’s posture and compare it with a presented posture to provide a feedback so that the user can train with the correct posture.

SUMMARY

The present invention relates to a motion feedback method and system that normalizes data according to a user’s motion based on expert data and provides feedback to the user.

Further, the present invention is directed to a method and system for providing feedback to the user in a multi modal manner by comparing the expert’s motion selected by the user with the user’s motion.

In order to solve the challenges described above, a motion feedback method according to the present invention may comprise the steps of: acquiring a frame in which a scene of the motion performed by a user is captured through a camera; acquiring motion data of the user by analyzing the captured frame; acquiring pressure data measured in response to the user’s motion through a pressure sensor; generating comparison target data by normalizing the motion data and the pressure data so as to correspond to pre-prepared reference data according to the expert’s motion; and comparing the reference data and the comparison target data to generate feedback data for the user’s motion, and outputting the generated feedback data.

Further, a motion feedback system according to the present invention may comprise: a storage unit that stores a frame in which a scene of the motion performed by a user is captured through a camera, and pressure data measured in response to the user’s motion through a pressure sensor; and a control unit that acquires the user’s motion data by analyzing the captured frame, generates comparison target data by normalizing the motion data and the pressure data so as to correspond to pre-prepared reference data according to the expert’s motion, and compares the reference data and the comparison target data to generate feedback data for the user’s motion, and outputs the generated feedback data.

Furthermore, a program stored in a computer-readable recording medium according to the present invention is executed by one or more processes in an electronic device and the program stored in the computer-readable recording medium may include instructions that cause the following steps to be performed: acquiring a frame in which a scene of the motion performed by a user is captured through a camera; acquiring motion data of the user by analyzing the captured frame; acquiring pressure data measured in response to the user’s motion through a pressure sensor; generating comparison target data by normalizing the motion data and the pressure data so as to correspond to pre-prepared reference data according to the expert’s motion; and comparing the reference data and the comparison target data to generate feedback data for the user’s motion, and outputting the generated feedback data.

According to various embodiments of the present invention, the motion feedback method and system synchronize motion data and pressure data based on a time stamp when the frame corresponding to the motion data for the user was captured and a time stamp when the pressure data was measured, whereby data loss can be prevented and the user’s motion can be fed back through sufficient data.

Further, according to various embodiments of the present invention, the motion feedback method and system correct the data measured according to the user’s motion to correspond to the data provided according to the expert’s motion, whereby it is possible to clearly compare various postures of the expert desired by the user with postures of the user, and thus to experience various postures of the expert.

Furthermore, according to various embodiments of the present invention, the motion feedback method and system compare the user’s posture with the posture of any expert desired by the user for various types of movements in real time, and can provide feedback about the user’s posture in a visually verifiable manner.

BRIEF DESCRIPTION OF THE DRAWINGS

FIGS. 3 to 10 depict an embodiment of a process for normalizing motion data and pressure data.

DETAILED DESCRIPTION

Figure 1:
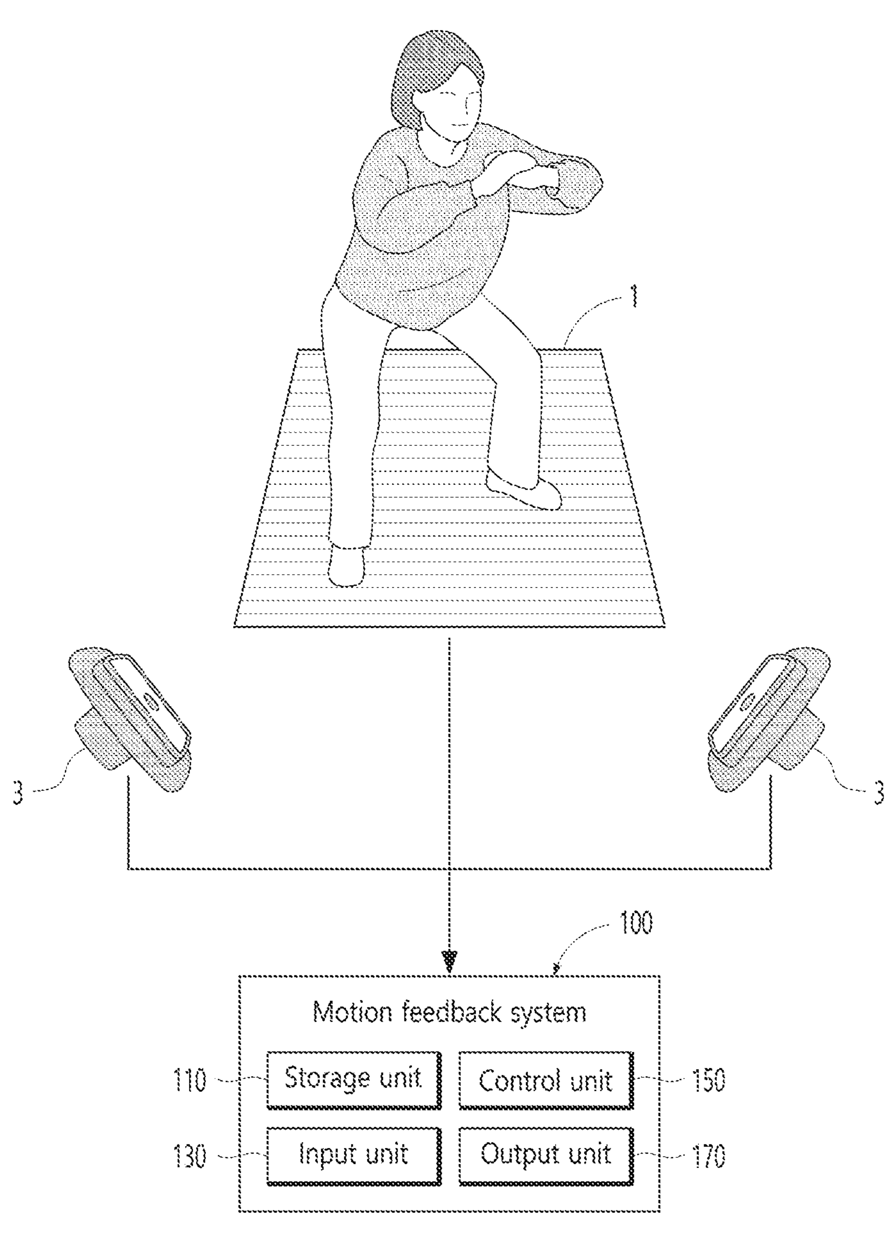
FIG. 1 shows a motion feedback system according to an embodiment of the present invention.

Hereinafter, embodiments disclosed in this specification will be described in detail with reference to the attached drawings. However, same or similar constitutive elements will be assigned the same reference numbers regardless of the drawing symbols, and duplicate descriptions thereof will be omitted. The suffixes "module" and "unit" for constitutive elements used in the following description are given or used interchangeably only for the ease of preparing the specification, and do not have distinct meanings or roles by themselves. Also, in explaining the embodiments disclosed in this specification, if it is determined that detailed description of related known technology may obscure the gist of the embodiments disclosed in this specification, the detailed description thereof will be omitted. In addition, since the attached drawings are only for easy understanding of the embodiments disclosed in this specification, it should be understood that the technical idea disclosed in this specification is not limited by the attached drawings, and that the attached drawings include all modifications, equivalents, and substitutes fallen within in the spirit and the technical scope of the present invention.

The terms containing ordinal numbers such as first, second, etc., may be used to explain various constitutive element, but these constitutive elements are not limited by said terms. The terms are used only for the purpose of distinguishing one constitutive element from other constitutive element.

In case a certain constitutive elements are said to be "joined" or "connected" to other constitutive element, it should be understood that it may be directly joined to or connected to the other constitutive element, but that another constitutive element may exist between them. On the other hand, in case a certain constitutive element is said to be "directly joined" or "directly connected" to other constitutive element, it should be understood that there are no other constitutive elements between them.

A singular expression includes a plural expression unless the context clearly dictates otherwise.

It should be understood that, in the subject application, the term such as "comprise" or "have" is intended to designate the presence of features, numbers, steps, motions, constitutive elements, parts, or combinations thereof described in the specification, without precluding the presence or addition of one or more other features, numbers, steps, motions, constitutive elements, parts or combinations thereof.

FIG. 1 shows a motion feedback system according to the present invention.

Referring to FIG. 1, a motion feedback system 100 according to the present invention can acquire data related to a user's motion through a camera 3 and an exercise mat 1 equipped with a pressure sensor, and generate feedback data about the user's motion by comparing the acquired data with pre-prepared data of an expert. Through this, the motion feedback system 100 can output the generated feedback data such that the user can check it.

Herein, at least one camera 3 may be provided to capture the user's body, and a scene performing a motion may be captured in a plurality of frames.

Accordingly, the motion feedback system 100 can acquire the user's motion data by analyzing a plurality of the frames received from the camera 3. The motion data is data generated by detecting the user's body (or a part of the body) in each frame, and may be generated by inferring a position of the user's skeleton (or joint) according to an embodiment. In this case, the motion feedback system 100 may be implemented to infer the user's skeleton from each frame using conventionally known techniques.

Meanwhile, the exercise mat 1 may be provided for the user to perform movement on the exercise mat 1. In this case, the exercise mat 1 may be equipped with a plurality of pressure sensors to measure pressure exerted by the user. The plurality of pressure sensors may be provided in an arbitrary arrangement, and measure pressure generated according to the user's center of gravity and transmit the pressure to the motion feedback system 100.

Accordingly, the motion feedback system 100 can confirm the user's center of gravity by receiving pressure data from the plurality of pressure sensors provided on the exercise mat 1 and analyzing the received pressure data.

This pressure data may include a plurality of pressure values received based on an arrangement of the plurality of pressure sensors. That is, the pressure data may be a matrix or array containing the plurality of pressure values measured through each of the plurality of pressure sensors.

According to the above configurations, data related to the user's motion may include motion data acquired from a scene captured through the camera 3 and pressure data measured through the pressure sensor.

Meanwhile, the pre-prepared data of an expert may include, as reference data, reference motion data acquired from a scene capturing the expert's motion, and reference pressure data measured from the pressure sensor according to the expert's motion.

Therefore, the reference data can acquire the reference motion data and the reference pressure data according to the expert's motion, similar to the process of acquiring the motion data and the pressure data according to the user's motion, and may be stored in the motion feedback system 100 in advance or implemented to receive from an external server provided in advance to store a plurality of reference data.

Furthermore, the motion feedback system 100 can generate comparison target data by normalizing data related to the user's motion so that the data related to the user's motion can be compared with reference data for the expert.

In this case, the comparison target data corrects the motion data and the pressure data according to the user's motion so as to correspond to the reference data, and may normalize the data related to the user's motion based on the expert's reference data.

Further, the feedback data may be generated to indicate parts of the user's motion that are different from the expert's motion, and for this purpose, it may be generated such that the user can check data that deviates from the reference data among the comparison target data.

For example, the motion feedback system 100 emphasizes the parts of the user's motion that deviate from the expert's motion, simultaneously with displaying the user's motion and the expert's motion by overlapping them, so that the user can generate the feedback data to identify parts different from the expert's motion and the user's own motion.

Through this, the motion feedback system 100 can generate the feedback data by comparing the reference data and the comparison target data, and output the feedback data to allow the user to check it.

To this end, the motion feedback system 100 may comprise a storage unit 110, an input unit 130, a control unit 150, and an output unit 170.

The storage unit 110 may store data and instructions required to perform overall operation of the motion feedback system 100. For example, the storage unit 110 may store reference data and store a plurality of frames and motion data acquired from a camera 3. In this case, the storage unit 110 may store the reference data for each of a plurality of different experts. Additionally, the storage unit 110 may store pressure data acquired from a pressure sensor and may store comparison target data and feedback data generated through the control unit 150.

The input unit 130 may be connected to the camera 3 through a wireless or wired network and receive a plurality of frames captured by the camera 3. Additionally, the input unit 130 may be connected to a pressure sensor or an exercise mat 1 with a built-in pressure sensor via the wireless or wired network to acquire the pressure data measured by the pressure sensor.

Also, the input unit 130 may be connected to an input device such as a keyboard, a mouse, or a touch pad through the wireless or wired network to receive user's instructions input through the input device. For example, the input unit 130 may input the user's instructions to select any one of the reference data for each of a plurality of different experts.

The control unit 150 may control overall operation of the motion feedback system 100. For example, the control unit 150 may generate motion data from the plurality of frames, generate the comparison target data for the motion data and the pressure data, and generate feedback data based on comparison of the reference data and the comparison target data.

The output unit 170 may be connected to a display device through the wired or wireless network to output the feedback data to the display device so that the user can visually check it. In addition, the output unit 170 may be connected to another device that induces the user's senses, such as hearing sense and tactile sense to output the feedback data so that the user can check it through the hearing and tactile senses.

Based on the configurations of the motion feedback system 100 discussed above, the motion feedback method will be described in more detail as follows.

Figure 2:
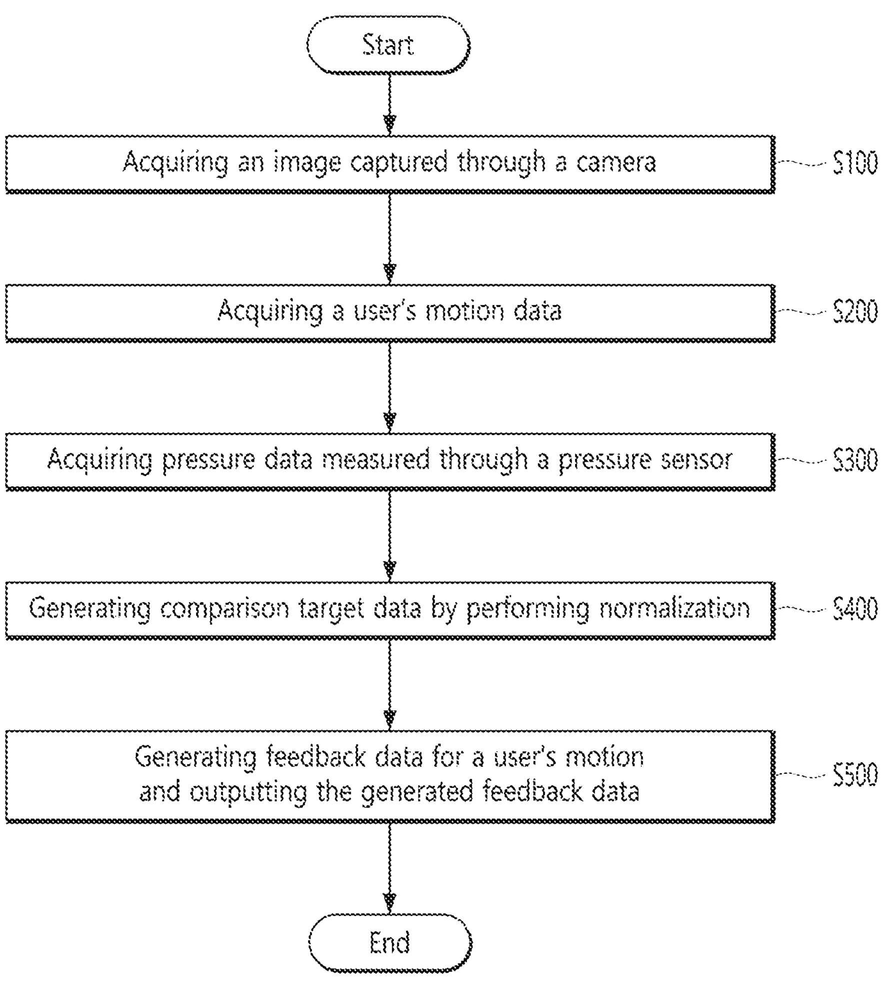
FIG. 2 is a flowchart showing a motion feedback method according to an embodiment the present invention.
Figure 11:
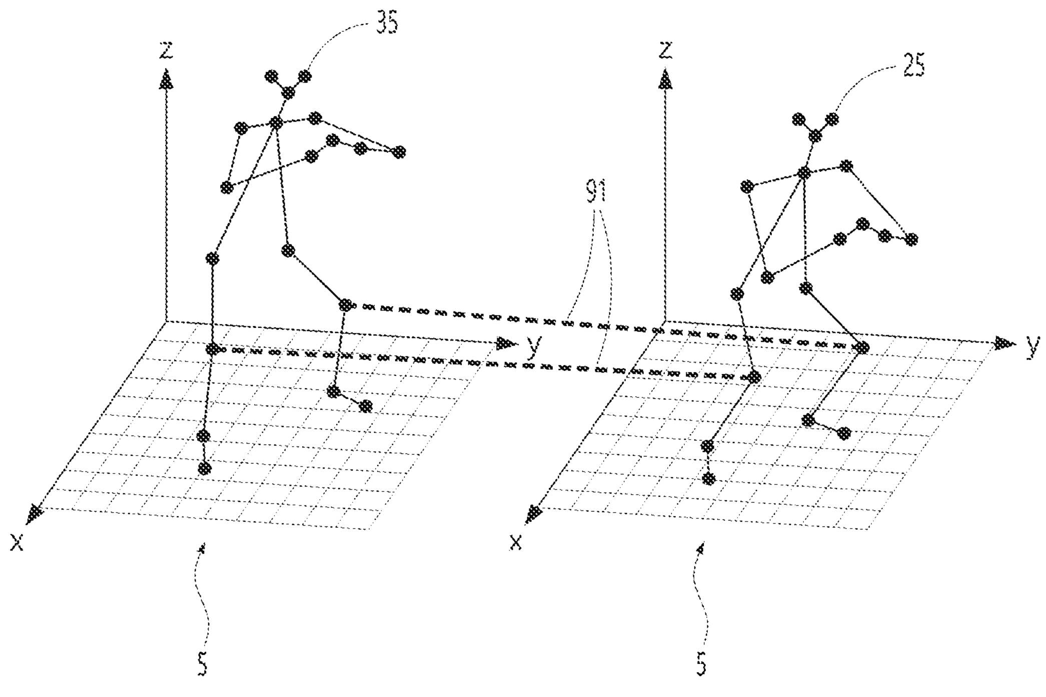
FIGS. 11 and 12 show an embodiment of a process for generating feedback data.
Figure 12:
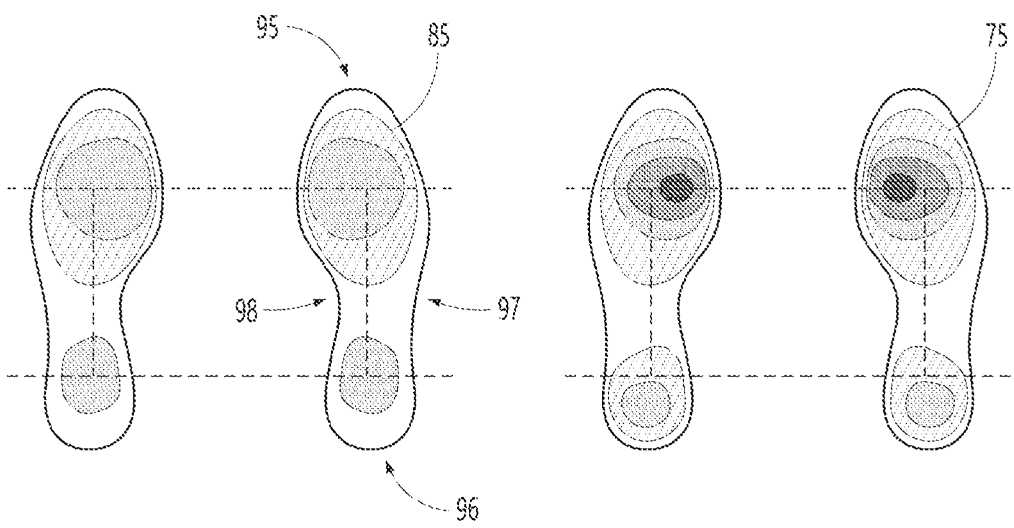

FIG. 2 is a flowchart showing a motion feedback method according to the present invention. FIGS. 3 to 10 depict an embodiment of a process for normalizing motion data and pressure data. FIGS. 11 and 12 show an embodiment of a process for generating the feedback data.

Referring to FIG. 2, the motion feedback system 100 according to the present invention may acquire a frame in which a scene of the motion performed by a user is captured through a camera (S100), acquire the user's motion data by analyzing the captured frame (S200), and acquire pressure data measured in response to the user's motion through a pressure sensor (S300).

Specifically, the motion feedback system 100 may acquire an image captured through the camera in a frame unit, detect the user's body (or a part of the body) in each acquired frame to generate the motion data.

For example, the motion feedback system 100 may detect the user's shape in each frame by using a model (e.g., an artificial neural network) prepared in advance so as to detect at least one of the position and shape of a person in the form of a bounding box at the image. Accordingly, the motion feedback system 100 may infer the user's posture depending on the shape of the bounding box corresponding to the user detected in each frame.

As another example, the motion feedback system 100 may infer the user's skeleton in each frame by using a model prepared in advance so as to infer a person's skeleton from the image. In this case, the motion feedback system 100 may set the inferred skeleton as motion data, or may extract a joint part from the inferred skeleton and set it as the motion data.

As described above, the motion feedback system 100 may acquire the motion data corresponding to the user's motion in each frame through various techniques previously known in the art.

Furthermore, the motion feedback system 100 may synchronize a time stamp for the motion data and a time stamp for the pressure data.

To this end, the motion feedback system 100 may record a point of time at which the frame is acquired to create the time stamp for the motion data, and record a point of time at which the pressure data is acquired to create the time stamp for the pressure data.

According to this, the motion feedback system 100 can compare two different time stamps and match the motion data and the pressure data recorded with the same time stamp (or the closest time stamp). In other words, the motion feedback system 100 can match the motion data and the pressure data to have a synchronized time stamp.

For example, the motion feedback system 100 may match first data with a long period of time between the time stamps to second data with a short period of time between the time stamps, among the motion data and the pressure data. In this case, the motion feedback system 100 may compare the time stamp of the first data and the time stamp of the second data to match data with the time stamps indicating the closest time.

As another example, the motion feedback system 100 may match the motion data and the pressure data where a difference between the time stamps corresponding to each of the motion data and the pressure data is within a preset time interval (e.g., 0.03 seconds).

Furthermore, the motion feedback system 100 may perform interpolation on the first data such that the first data with a long period of time of the time stamp corresponds to the second data with a short period of time, among the motion data and pressure data.

For example, the motion feedback system 100 may perform the interpolation on the first data, based on the number of data included between the first data and the matched data among the second data. Through this, the motion feedback system 100 can perform synchronization so that the first data and the second data include the same number of data within the same period of time.

In this case, the data included in the second data may be data that was actually measured, and the data included in the first data may include data generated through the interpolation between actually measured data.

As other example, the motion feedback system 100 may perform the interpolation on each of the first data and the second data so that the same number of data is included among the matched data. In this case, the data included in each of the first data and second data may include data generated through the interpolation between actually measured data.

As another example, the motion feedback system 100 may use matched data and unmatched data, respectively, in the process of performing the interpolation on at least one of the motion data and the pressure data. That is, the motion feedback system 100 may perform the interpolation by using data corresponding to the time stamp immediately before and immediately after the time stamp of data to be generated through the interpolation.

Further, the motion feedback system 100 may perform the interpolation by further using other data adjacent to the data used for interpolation, and may assign weights to the data used for the interpolation based on a difference between the time stamp of data to be generated through the interpolation and the time stamp of each of data used for the interpolation.

Through the above configurations, the motion feedback system 100 can prevent data loss and perform feedback of the user's motion through sufficient data by synchronizing the motion data and the pressure data based on the time stamp when the frame corresponding to the motion data was captured and the time stamp when the pressure data was measured.

Meanwhile, the motion feedback system 100 according to the present invention may generate comparison target data by performing normalization on the motion data and the pressure data to correspond to reference data pre-prepared according to the expert's motion (S400).

Specifically, the motion feedback system 100 may transform the user's body size according to at least one of the motion data and the pressure data to correspond to the expert's body size according to the reference data.

In this case, the motion feedback system 100 may transform the other data to correspond to data related to a smaller body size among the expert's body size and the user's body size.

Figure 3:
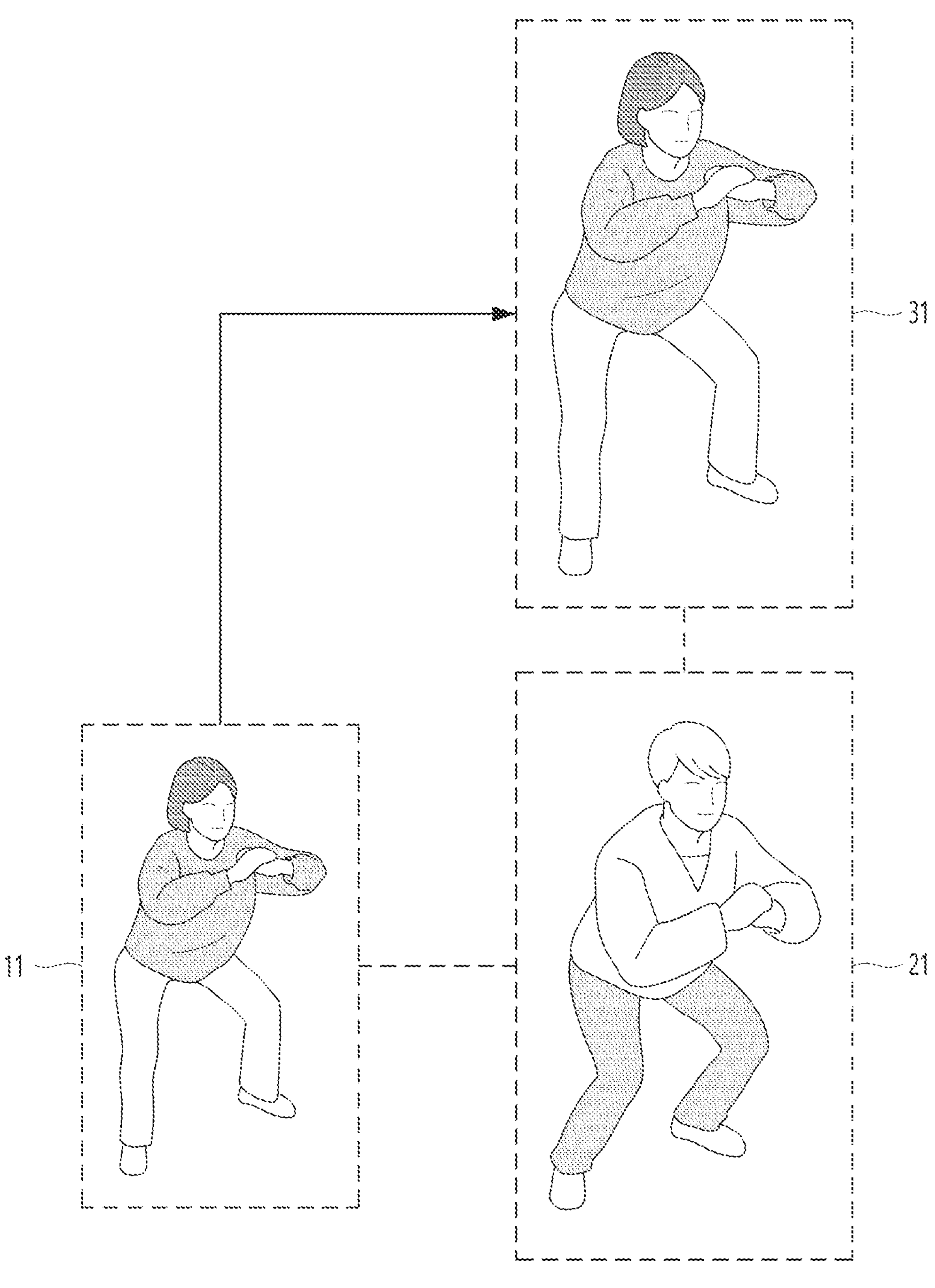

For example, with reference to FIG. 3, the motion feedback system 100 may, based on a shape of the bounding box 21 corresponding to a specific motion preset for the reference data, transform a shape of the bounding box 11 in the motion corresponding to a specific motion among the motion data.

In an embodiment, the motion feedback system 100 may transform a longitudinal length and a transverse length of the bounding box 11 of the motion data at a point of time when the longitudinal length of the bounding box 11 of the motion data is longest, based on a longitudinal length and a transverse length of the bounding box 21 of the reference data at a point of time when the longitudinal length of the bounding box 21 of the reference data is longest.

In this case, the motion feedback system 100 may calculate a ratio of the longitudinal length and the transverse length of the bounding box 11 of the motion data to the bounding box 21 of the reference data, and transform the motion data by applying the calculated ratio to all bounding boxes 11 of the motion data.

In other embodiment, the motion feedback system 100 may transform a longitudinal length and a transverse length of the bounding box 11 of the motion data at a point of time when an area of the bounding box 11 of the motion data is largest (or smallest), based on a longitudinal length and a transverse length of the bounding box 21 of the reference data at a point of time when an area of the bounding box 21 of the reference data is largest (or smallest).

Figure 4:
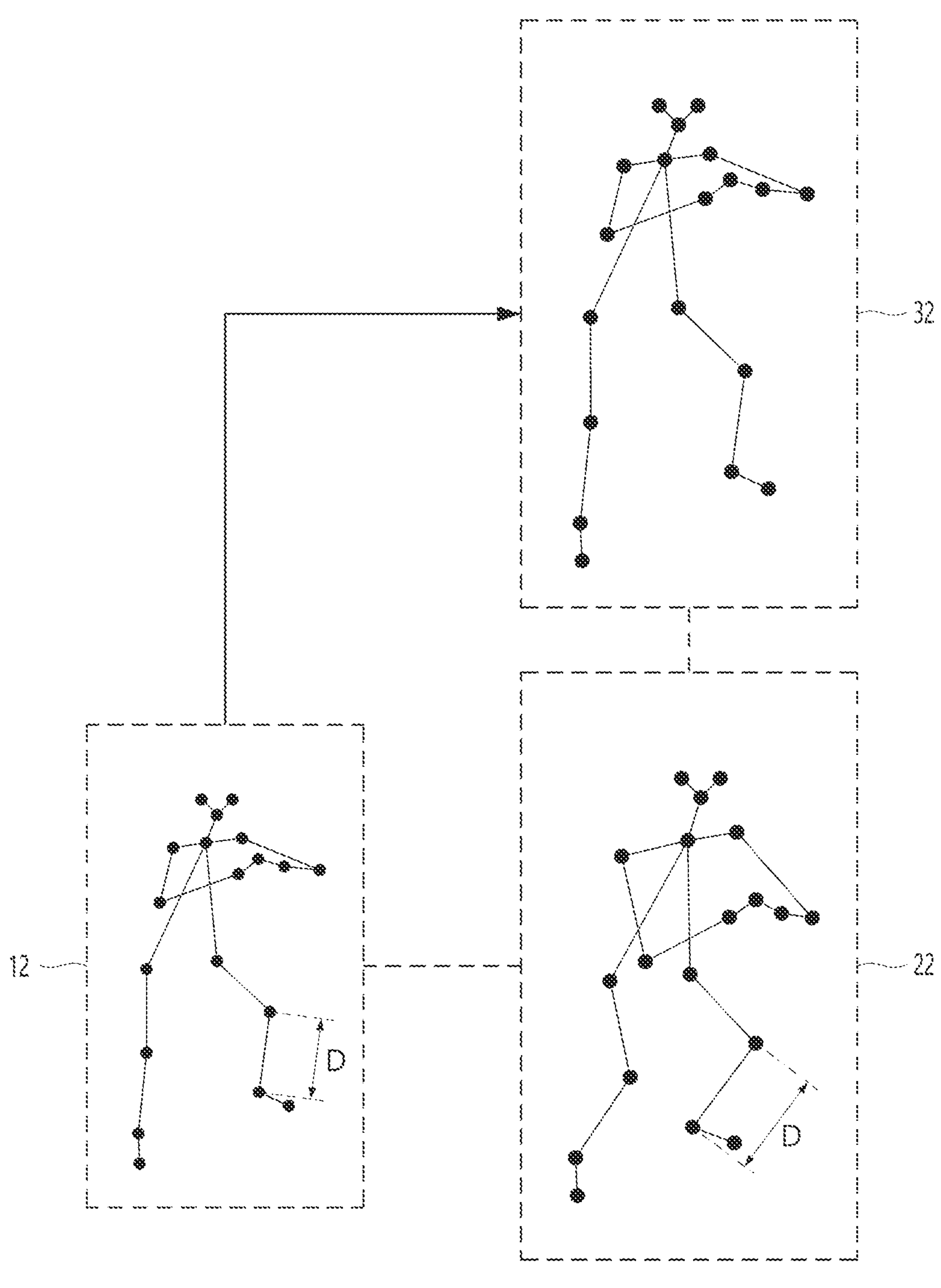

For another embodiment with reference to FIG. 4, the motion feedback system 100 may transform a user's skeleton 12 to correspond to an expert's skeleton 22 by comparing the expert's skeleton 22 indicated in the reference data with the user's skeleton 12 indicated in the motion data.

In an embodiment, the motion feedback system 100 may match the expert's skeleton 22 in the reference data and the user's skeleton 12 in the motion data for each body part, and transform the motion data so that a size (or a length) between the matched skeletal parts becomes identical with each other.

In this case, the motion feedback system 100 may match the skeletal parts depending on a relative position between the skeletal parts on the basis of a specific skeletal part (for example, a head skeleton or a pelvic skeleton). Alternatively, the motion feedback system 100 may match the skeletal parts based on data labeled for each skeletal part.

In other embodiment, the motion feedback system 100 may match a joint part 22 in the reference data and a joint part 12 in the motion data for each body part, and transform the motion data so that a distance interval between the matched joint parts becomes the same.

Figure 5:
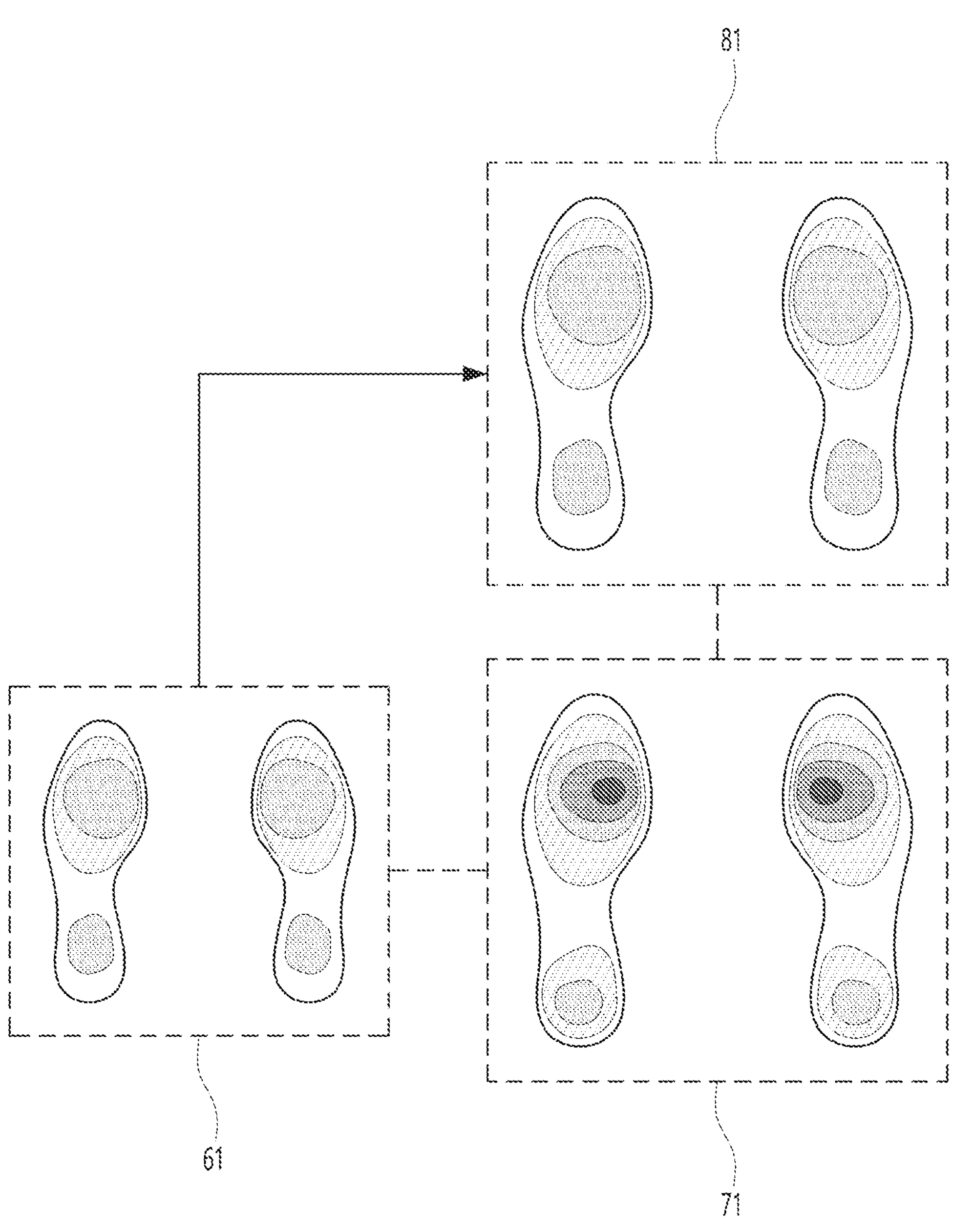

As another example with reference to FIG. 5, the motion feedback system 100 may transform a range in which a pressure value of a pressure data 61 measured for the user exists to correspond to a range in which a pressure value of a reference pressure data 71 included in the reference data exists.

In an embodiment, the motion feedback system 100 may transform the pressure data 61 such that a difference in the number of pressure values each included in a first range in which the pressure values exist in the reference pressure data 71 contained in the reference data and a second range in which the pressure values exist in the pressure data 61 measured for the user is within a preset tolerance.

To this end, the motion feedback system 100 may adjust levels of a plurality of pressure values included in a range corresponding to the first range in the pressure data 61.

Alternatively, the motion feedback system 100 may add a weight determined based on a plurality of pressure values included in the second range, to a plurality of pressure values included in the range corresponding to the first range in the pressure data 61. In this case, the motion feedback system 100 may determine, as a weight, a ratio of each pressure value to a difference between the largest pressure value and the smallest pressure value among the plurality of pressure values included in the second range.

In this regard, in case the first range is larger than the second range, the motion feedback system 100 may determine, as a weight, a ratio of each pressure value to a difference between the largest pressure value and a value to be added to the pressure data 61 corresponding to the first range, among the plurality of pressure values included in the second range.

In this case, the motion feedback system 100 may transform the pressure data 61 such that the first range and the second range correspond to each other by matching a center point of the first range and a center point of the second range.

Furthermore, the motion feedback system 100 may extract a plurality of first frames corresponding to one time of the expert's motion from the reference data in order to correspond to the expert's motion speed according to the reference data and the user's motion speed according to the motion data, and extract a plurality of second frames corresponding to one time of the user's motion from the motion data.

Figure 6:
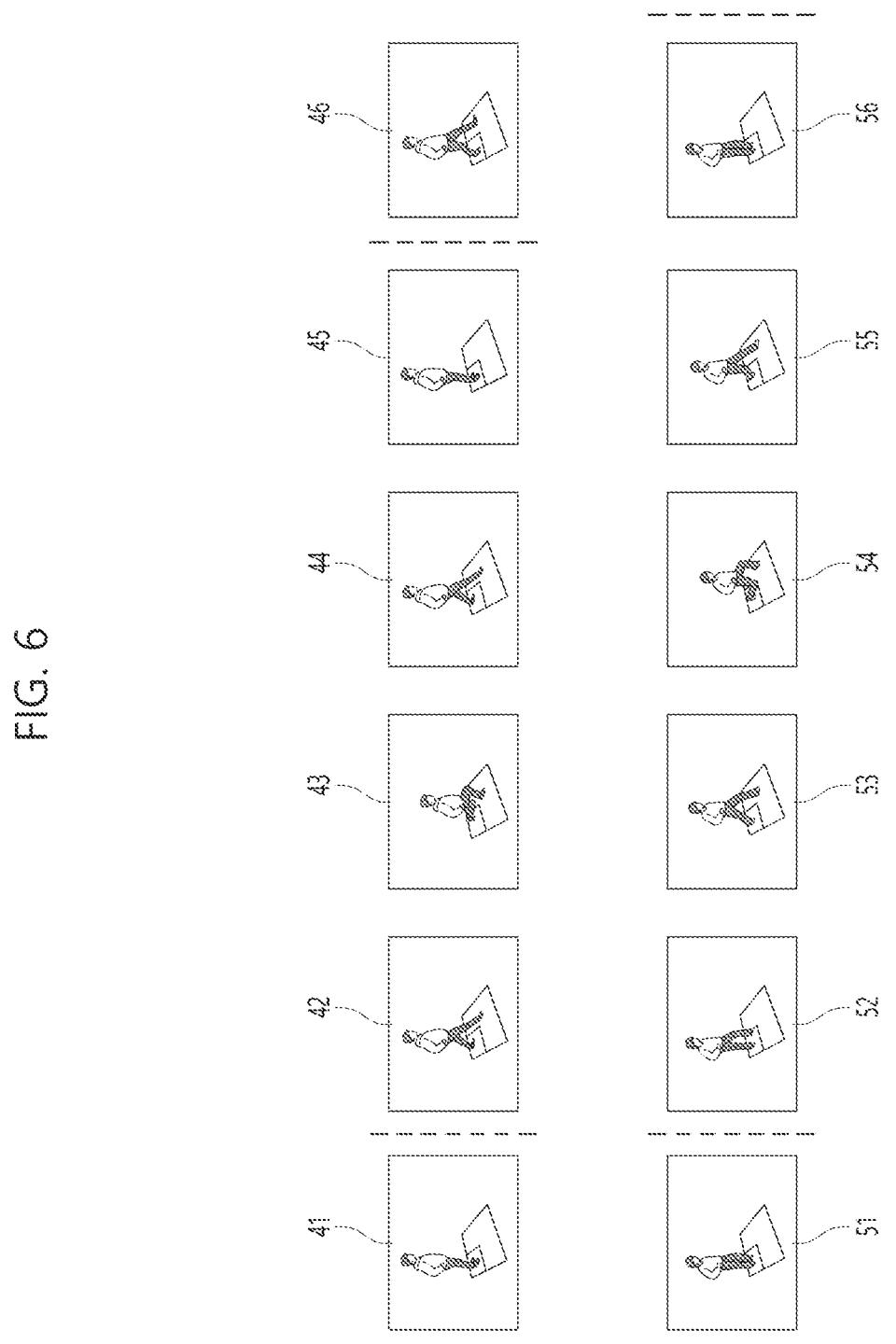

For example, with reference to FIG. 6, the motion feedback system 100 may identify a size of a first bounding box detected from any one frame 42 among a plurality of frames 41, 42, 43, 44, 45, and 46 according to the reference data, and, if another frame 46 in which a bounding box of the same size as the first bounding box is detected is identified among the plurality of frames 43, 44, 45, and 46 after the any one frame, may extract the plurality of frames 42, 43, 44, and 45 from the any one frame 42 to the frame 45 just before the other frame 46, as a plurality of first frames 42, 43, 44, and 45 corresponding to one time of the expert's motion.

Also, the motion feedback system 100 may extract a plurality of second frames 52, 53, 54, 55, and 56 corresponding to one time of the user's motion from the motion data in the same manner as above.

As another example, the motion feedback system 100 may identify a position of a joint detected from any one frame 42 among a plurality of frames 41, 42, 43, 44, 45, and 46 according to the reference data, and, if another frame 46 in which a joint of the same position as the joint detected from the any one frame 42 is detected is identified among the plurality of frames after the any one frame 42, may extract the plurality of frames 42, 43, 44, and 45 from the any one frame 42 to the frame 45 just before the other frame 46, as a plurality of first frames 42, 43, 44, and 45 corresponding to one time of the expert's motion.

Also, the motion feedback system 100 may extract a plurality of second frames 52, 53, 54, 55, and 56 corresponding to one time of the user's motion from the motion data in the same manner as above.

Furthermore, the motion feedback system 100 may adjust a frame interval of the plurality of second frames corresponding to one time of the user's motion based on the plurality of first frames corresponding to one time of the expert's motion, so that the expert's motion speed according to the reference data corresponds to the user's motion speed according to the motion data.

Figure 7:
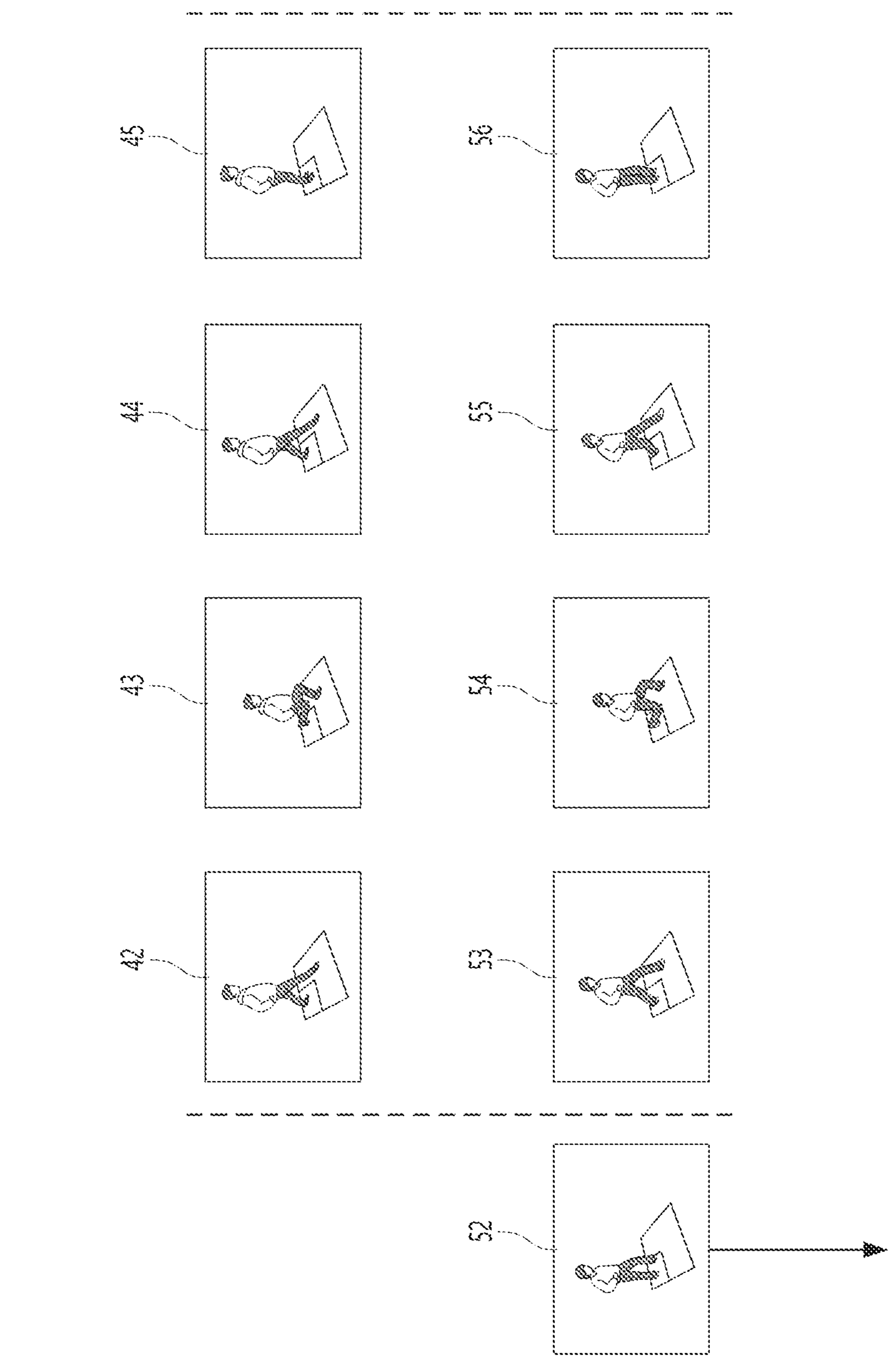

For example, with reference to FIG. 7, the motion feedback system 100 may remove or add one or more frames among the plurality of second frames 52, 53, 54, 55, and 56 such that the number of the plurality of second frames 52, 53, 54, 55, and 56 is equal to the number of the plurality of first frames 42, 43, 44, and 45.

In an embodiment, in case the motion feedback system 100 consists of the plurality of first frames 42, 43, 44, and 45 as four frames and the plurality of second frames 52, 53, 54, 55, and 56 as five frames so that the expert's motion speed is faster than the user's motion speed, any one of the plurality of second frames 52, 53, 54, 55, and 56 may be removed (for example, the first frame 52).

In this case, the motion feedback system 100 may remove a frame with the least (or stopped) change in the motion data from the previous frames (or the next frames).

In other embodiment, in case the motion feedback system 100 consists of the plurality of first frames as five frames and the plurality of second frames as four frames so that the expert's motion speed is slower than the user's motion speed, another frame generated based on the plurality of second frames may be added through interpolation of the plurality of second frames.

As another example, the motion feedback system 100 may adjust at least one frame interval among the plurality of second frames and the plurality of first frames such that a motion time of the plurality of second frames becomes identical to a motion time of the plurality of first frames.

Figure 8:
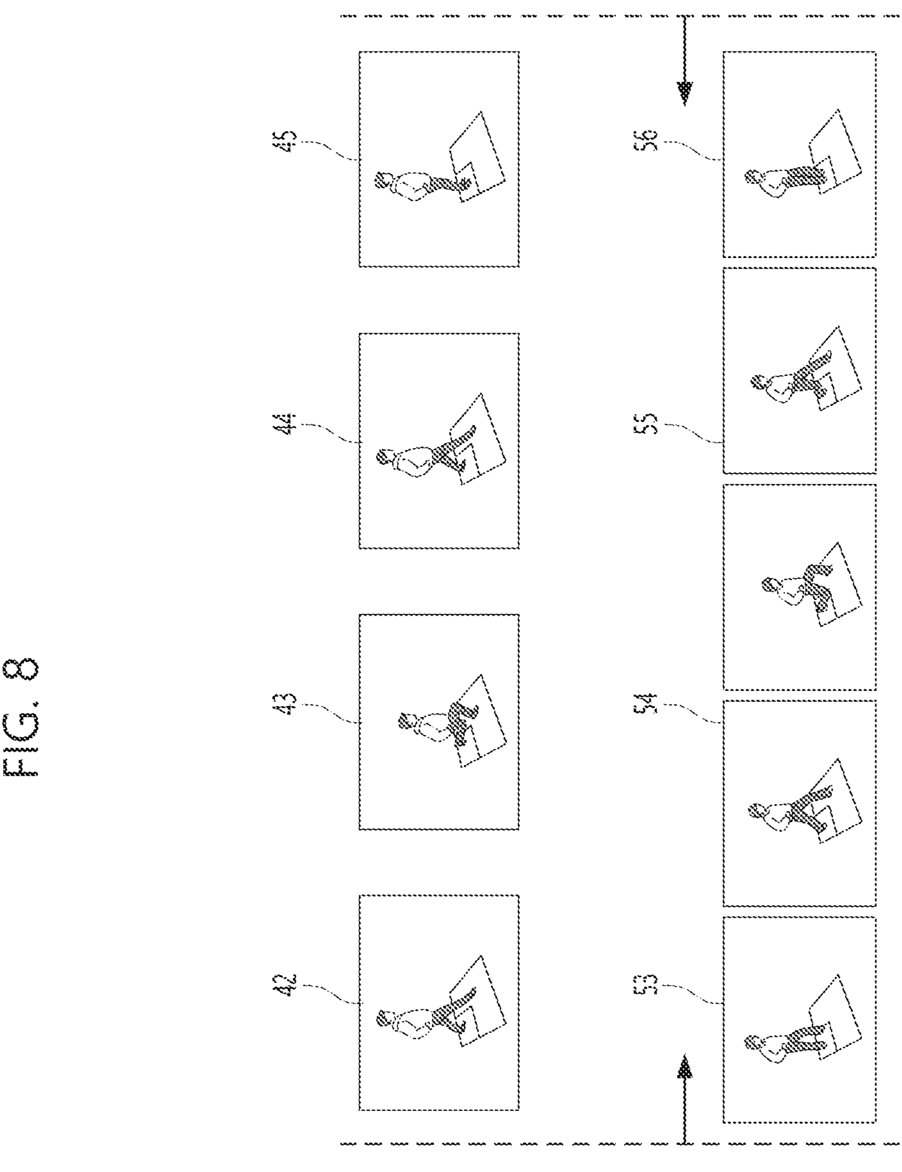

In an embodiment as shown in FIG. 8, in case the motion feedback system 100 consists of the plurality of first frames 42, 43, 44, and 45 as four frames and the plurality of second frames 52, 53, 54, 55, and 56 as five frames so that the expert's motion speed is faster than the user's motion speed, a frame interval of the plurality of second frames 52, 53, 54, 55, and 56 may be adjusted such that a motion time according to the plurality of second frames 52, 53, 54, 55, and 56 corresponds to a motion time of the plurality of first frames 42, 43, 44, and 45.

In this case, the motion time according to the plurality of frames may be a time interval from a time stamp of the first frame to a time stamp of the last frame among the plurality of frames. Additionally, adjustment of the frame interval may mean adjusting a time stamp corresponding to each of the plurality of frames.

Accordingly, the motion feedback system 100 may adjust the frame interval such that the user's motion time becomes the same as the expert's motion time by adjusting the time stamp such that a time interval between the time stamps corresponding to each of the plurality of second frames is shortened.

Additionally, in the case of adjusting the time stamps corresponding to each of the plurality of frames, the motion feedback system 100 may equally adjust the time stamps of pressure data corresponding to each of the plurality of frames.

Figure 9:
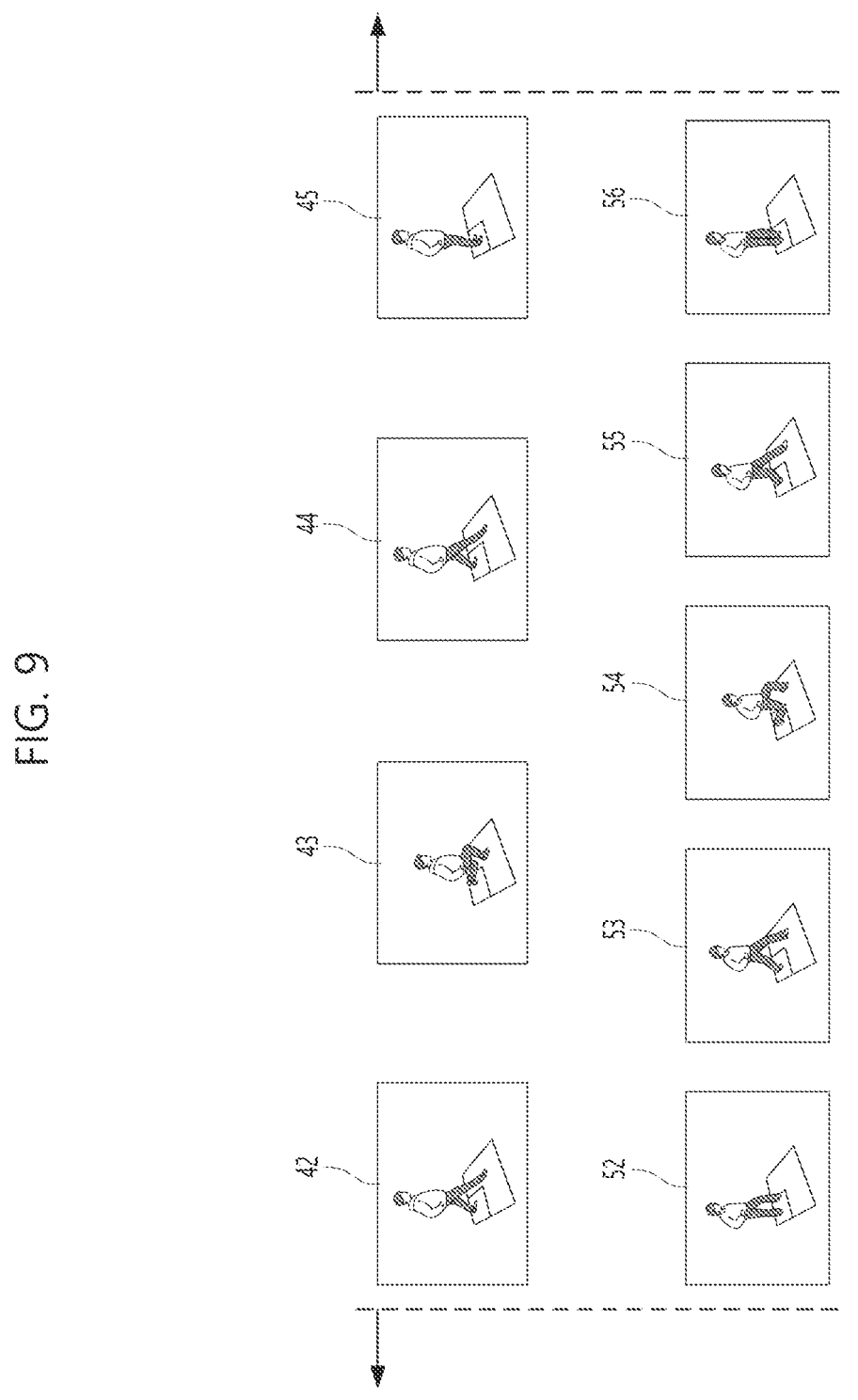

In another embodiment as shown in FIG. 9, the motion feedback system 100 may adjust a frame interval of the plurality of first frames 42, 43, 44, and 45 such that a motion time according to the plurality of second frames 52, 53, 54, 55, and 56 corresponds to a motion time according to the plurality of first frames 42, 43, 44, and 45.

That is, the motion feedback system 100 may adjust the frame interval such that the user's motion time becomes the same as the expert's motion time by adjusting a time stamp such that a time interval between the time stamps corresponding to each of the plurality of first frames becomes longer.

In other embodiment, in case the motion feedback system 100 consists of the plurality of first frames as five frames and the plurality of second frames as four frames so that the expert's motion speed is slower than the user's motion speed, the frame interval of the plurality of second frames may be adjusted such that a motion time of the plurality of second frames corresponds to a motion time of the plurality of first frames.

That is, the motion feedback system 100 may adjust the frame interval such that the user's motion time becomes the same as the expert's motion time by adjusting a time stamp such that a time interval between the time stamps corresponding to each of the plurality of second frames becomes longer.

In another embodiment, the motion feedback system 100 may also adjust the frame interval such that the user's motion time becomes the same as the expert's motion time by adjusting the time stamps such that a time interval between the time stamps corresponding to each of the plurality of first frames is shorter.

Furthermore, the motion feedback system 100 may correct a pressure value of the pressure data such that a size of the pressure value of the reference pressure data included in the reference data corresponds to a size of the pressure value of the pressure data measured according to the user's motion.

For example, the motion feedback system 100 may calculate and compare an average value of the plurality of pressure values included in the reference pressure data and an average value of the plurality of pressure values included in the pressure data. Accordingly, the motion feedback system 100 may correct the pressure data such that average values of the pressure values included in the reference pressure data and the pressure data become identical to each other, by determining a weight to be applied to the plurality of pressure values included in the pressure data based on a difference between the calculated average values and applying the determined weight to the plurality of pressure values included in the pressure data.

Figure 10:
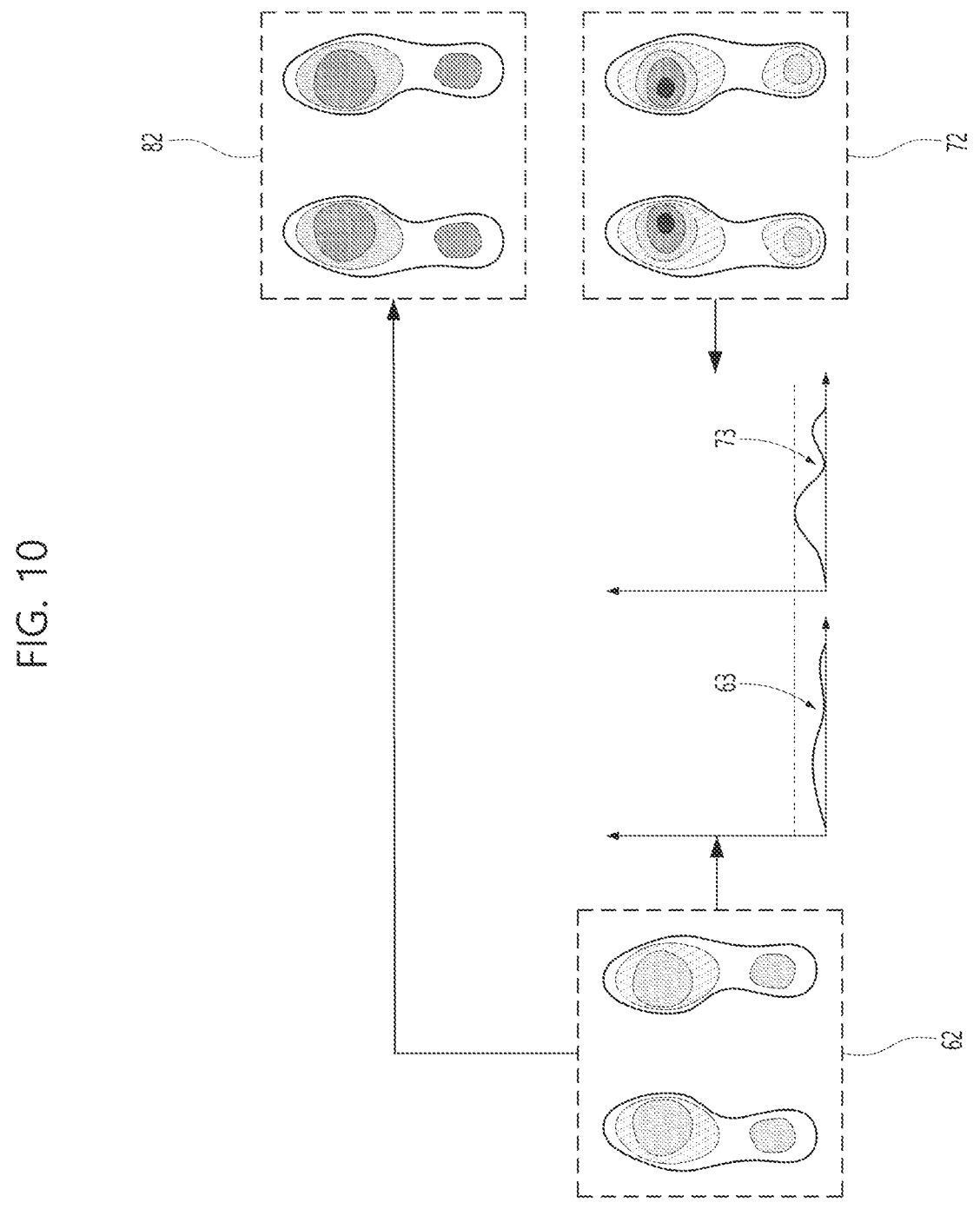

As another example with reference to FIG. 10, the motion feedback system 100 may correct the plurality of pressure values 63 included in the pressure data 62 such that a maximum value among the plurality of pressure values 73 included in the reference pressure data 72 and a maximum value among the plurality of pressure values 63 included in the pressure data 62 are identical to each other.

As another example, the motion feedback system 100 may correct the plurality of pressure values included in the pressure data such that a minimum value among the plurality of pressure values included in the reference pressure data and a minimum value among the plurality of pressure values included in the pressure data are identical to each other.

Through the above configurations, the motion feedback system 100 can generate comparison target data by performing normalization on at least one of the motion data and the pressure data. That is, the motion feedback system 100 can generate the comparison target data by performing at least one of transformation of the body size, transformation of the existing pressure value range, frame extraction according to one time of motion, adjustment of the frame interval, and adjustment of the pressure value, for at least one of the motion data and the pressure data.

As such, the motion feedback system 100 allows the user to clearly compare the user's posture with the various experts' posture desired by the user by correcting the data measured according to the user's motion to correspond to the data provided according to the expert's motion. Through this, the user can experience the postures of various experts.

Referring again to FIG. 2, the motion feedback system 100 according to the present invention can generate feedback data for the user's motion by comparing reference data and comparison target data, and output the generated feedback data (S500).

Specifically, the motion feedback system 100 compares the user's posture and the expert's posture according to the comparison target data, and when the user's posture is identified to be beyond a predetermined area from the expert's posture, the system 100 generates the feedback data to emphasize the corresponding area.

For this purpose, the motion feedback system 100 can compare the user's posture with the expert's posture by designating a point (e.g., a point corresponding to the ankle joint area) among the user's posture according to the comparison target data and a point (e.g., a point corresponding to the ankle joint area) of the expert's posture as a reference point. That is, the motion feedback system 100 may correct the position of either the user's posture or the expert's posture by calculating a difference in the position between a point of the user's posture and a point of the expert's posture.

Further, the motion feedback system 100 compares the user's center of gravity and the expert's center of gravity according to the comparison target data, and when the user's center of gravity is identified to be beyond a predetermined area from the expert's center of gravity, the system 100 generates the feedback data to emphasize the corresponding area.

That is, the feedback data may include data about at least one of the user's posture and center of gravity.

For example, with reference to FIG. 11, the motion feedback system 100 may compare a position of the expert's skeleton 25 (or joint area) shown in the reference data and a position of the user's skeleton 35 (or joint area) shown in the comparison target data.

Accordingly, when the position of the user's skeleton 35 deviates from a predetermined area (for example, a circular area with a radius of 6 μm) based on the position of the expert's skeleton 25, the motion feedback system 100 can generate feedback data for the corresponding skeleton.

In this case, the feedback data may be generated to indicate a point at which the position of the user's skeleton 35 must be reached based on the position of the expert's skeleton 25.

Also, the reference data may be set to a predetermined area for generating the feedback data only for at least some of the skeleton (or joint area). In this case, the motion feedback system 100 may generate the feedback data related to the corresponding skeleton (or joint area) and may not generate the feedback data for other skeleton (or other joint area).

As another example with reference to FIG. 12, the motion feedback system 100 may divide the pressure values included in the reference data and the comparison target data into a plurality of areas 95, 96, 97, and 98, and compare a distribution of the expert's pressure values (75) indicated in the reference data and a distribution (85) of the user's pressure values indicating in the comparison target data.

In this case, in case an area at which the expert's center of gravity is concentrated and an area at which the user's center of gravity is concentrated are different from each other among the plurality of divided areas 95, 96, 97, and 98, the motion feedback system 100 can generate the feedback data for the areas.

To this end, in an embodiment, the motion feedback system 100 may generate the feedback data about the center of gravity by comparing an area containing a maximum value among the expert's pressure values and an area containing a maximum value among the user's pressure values in the plurality of divided areas.

As other example, the motion feedback system 100 may divide the pressure values included in the reference data and the comparison target data into a plurality of areas and compare a distribution of the expert's pressure values indicated in the reference data and a distribution of the user's pressure values indicated in the comparison target data in each area.

In this case, when a maximum value among the user's pressure values deviates from a predetermined area in a maximum value among the expert's pressure values, the motion feedback system 100 may generate feedback data about the center of gravity in the area.

At this time, the motion feedback system 100 may include the centers of gravity for each of the plurality of areas in the feedback data, and through this, the motion feedback system 100 may provide more detailed feedback data about the center of gravity.

Furthermore, the motion feedback system 100 may output the expert's motion according to the reference data and the user's motion according to the comparison target data by overlapping them. In this case, the motion feedback system 100 may output the expert's skeleton detected according to the reference data and the user's skeleton according to the comparison target data by overlapping them.

In this case, the motion feedback system 100 may output the user's skeleton overlapped on the expert's skeleton to emphasize a skeleton part corresponding to the feedback data.

Through the above configurations, the motion feedback system 100 according to the present invention can compare the user's posture with the posture of any expert desired by the user for various types of movements in real time, and provide feedback about the user's posture in a visually verifiable manner.

Therefore, the motion feedback system 100 according to the present invention allows the user to experience postures of various experts and easily follow the expert's posture that is suitable for the user.

Moreover, the motion feedback system 100 according to the present invention can more easily train the expert's posture that is difficult to receive direct train by analyzing the expert's posture reproduced through various images.

Furthermore, the present invention as discussed above can be implemented as a computer-readable code or instructions on a program-recorded medium. That is, the various control methods according to the present invention may be provided in either the integrated form or the individual form of a program.

Meanwhile, the computer-readable medium includes all types of recording devices that store data capable of being read by a computer system. An Example of the computer-readable medium includes HDD (Hard Disk Drive), SSD (Solid State Disk), SDD (Silicon Disk Drive), ROM, RAM, CD-ROM, a magnetic tape, a floppy disk, an optical data storage device, etc.

Further, the computer-readable medium may be a server or cloud storage that includes a storage and can be accessed through communication of an electronic device. In this case, the computer can download the program according to the present invention from the server or the cloud storage through a wired or wireless communication.

Furthermore, according to the present invention, the computer as described above is an electronic device equipped with a processor, that is, a CPU (Central Processing Unit), and is not particularly limited on a type thereof.

Meanwhile, the detailed description as explained above should not be construed as restrictive in all respects and should be considered to be for illustration. The scope of the present invention should be determined by reasonable interpretation of the appended claims, and all changes within the equivalent scope of the present invention are included in the scope of the present invention.

What is claimed is:

1. A motion feedback method comprising:
- acquiring a frame in which a scene of a motion of a user is captured through a camera;
- acquiring motion data of the user by analyzing the frame;
- acquiring pressure data measured in response to the motion of the user through a pressure sensor;
- generating comparison target data by normalizing at least one of the motion data and the pressure data so as to correspond to reference data pre-prepared according to a motion of an expert; and
- comparing the reference data and the comparison target data to generate feedback data for the motion of the user, and outputting the generated feedback data,
- wherein normalizing the pressure data comprises at least one of:
  - transforming a range of pressure values of the pressure data to correspond to a range of reference pressure values included in the reference data; and
  - correcting the pressure values of the pressure data so that the pressure values of the pressure data correspond to the reference pressure values included in the reference data.

2. The motion feedback method according to claim 1, wherein:
- the acquiring the motion data comprises creating a time stamp for the motion data by recording a point of time at which the frame is acquired, and
- the acquiring the pressure data comprises generating a time stamp for the pressure data by recording a point of time at which the pressure data is acquired, and
- the method further comprises synchronizing the motion data and the pressure data by comparing the two time stamps different from each other.

3. The motion feedback method according to claim 2, wherein the synchronizing the motion data and the pressure data comprises performing interpolation on a first data such that the first data with a long period of time of the time stamp corresponds to a second data with a short period of time of the time stamp, among the motion data and the pressure data.

4. The motion feedback method according to claim 1, wherein normalizing the motion data comprises transforming a skeleton of the user to correspond to the skeleton of the expert by comparing the skeleton of the expert indicated in the reference data with the skeleton of the user appearing in the motion data.

5. The motion feedback method according to claim 1, wherein normalizing the motion data comprises:
- extracting a plurality of first frames corresponding to one time of the motion of the expert from the reference data; and
- extracting a plurality of second frames corresponding to one time of the motion of the user from the motion data.

6. The motion feedback method according to claim 5, wherein normalizing the motion data comprises adjusting a frame interval of the plurality of second frames based on the plurality of first frames such that a speed of the motion of the expert according to the reference data corresponds to a speed of the motion of the user according to the motion data.

7. A motion feedback system comprising:
- a storage unit that stores a frame in which a scene of a motion of a user is captured through a camera, and pressure data measured in response to the motion of the user through a pressure sensor; and
- a control unit that acquires motion data of the user by analyzing the frame, generates comparison target data by normalizing at least one of the motion data and the pressure data so as to correspond to reference data pre-prepared according to a motion of an expert, and compares the reference data and the comparison target data to generate feedback data for the motion of the user and outputs the generated feedback data
- wherein normalizing the pressure data comprises at least one of:
  - transforming a range of pressure values of the pressure data to correspond to a range of reference pressure values included in the reference data; and
  - correcting the pressure values of the pressure data so that the pressure values of the pressure data correspond to the reference pressure values included in the reference data.

8. A non-transitory computer-readable recording medium storing a program executable by one or more processors in an electronic device, wherein the program comprises instructions that cause the one or more processors to implement a method comprising:
- acquiring a frame in which a scene of a motion of a user is captured through a camera;
- acquiring motion data of the user by analyzing the frame;
- acquiring pressure data measured in response to the motion of the user through a pressure sensor;
- generating comparison target data by normalizing at least one of the motion data and the pressure data so as to correspond to reference data pre-prepared according to a motion of an expert; and
- comparing the reference data and the comparison target data to generate feedback data for the motion of the user, and outputting the generated feedback data,
- wherein normalizing the pressure data comprises at least one of:

transforming a range of pressure values of the pressure data to correspond to a range of reference pressure values included in the reference data; and correcting the pressure values of the pressure data so that the pressure values of the pressure data correspond to the reference pressure values included in the reference data.

9. The motion feedback method according to claim 1, wherein normalizing the motion data comprises transforming a body size of the user based on the motion data to correspond to a body size of the expert based on the reference data.

* * * * *